Oct. 13, 1970     E. D. HINDENBURG     3,533,599

FISH TAPE WINDER

Original Filed June 2, 1967

INVENTOR
EUGENE D. HINDENBURG

BY
Mann, Brown & McWilliams
ATTORNEYS

United States Patent Office 3,533,599
Patented Oct. 13, 1970

3,533,599
FISH TAPE WINDER
Eugene D. Hindenburg, Sycamore, Ill., assignor to Holub Industries, Inc., a corporation of Illinois
Continuation of application Ser. No. 643,140, June 2, 1967. This application Sept. 10, 1969, Ser. No. 871,795
Int. Cl. E21c 29/16
U.S. Cl. 254—134.3                    6 Claims

ABSTRACT OF THE DISCLOSURE

The present invention relates to electrical fish tape winders, and has particular, although not exclusive, utility in connection with such winders formed of plastic.

---

This application is a continuation of Ser. No. 643,140, filed June 2, 1967, now abandoned.

Fish tape winders typically comprise a toroidal reel which houses the coiled fish tape. The tape is payed out of the reel through a slot formed in the outer circumferential surface thereof. Modern fish tape winders include a handle which is engaged with the reel and movable thereabout. The fish tape is fed through a guideway in the handle thereby maintaining strict control over the tape, which has a high amount of stored energy in its coiled form.

Because of the tendency of the tape to straighten itself out, or in the case of fish tape winders, resist being coiled, the tape, when being payed into the reel tends to coil about the outer periphery of the chamber defined by the reel. Accordingly, when substantial quantities of the tape have been payed out, difficulty is encountered in rewinding it into the reel.

In order to assist in the rewinding effort, the present invention provides a friction brake which permits the operator to exert a drag on the tape, while being payed in, sufficient to overcome the tendency of the tape to resist being tightly wound. Accordingly, the tape is readily coiled about the inner diameter of the chamber within the reel and no problem is incurred in getting all of the tape easily into the reel.

Fish tape winders of the type for which the present invention has particular, although not exclusive utility, are disclosed and described in detail in Schinske application Ser. No. 491,521, filed Sept. 30, 1965, now Pat. No. 3,355,123. The construction there illustrated relates particularly to fish tape winders made of high impact plastic material. The present invention represents an improvement in fish tape winders of the type disclosed in Schinske.

Fish tape winders typically comprise a toroidal reel which houses the coiled fish tape. The tape is payed out of the reel through a slot formed in the outer circumferential surface thereof. Modern fish tape winders include a handle which is engaged with the reel and movable thereabout. The fish tape is fed through a guideway in the handle thereby maintaining strict control over the tape, which has a high amount of stored energy in its coiled form.

Because of the tendency of the tape to straighten itself out, or in the case of fish tape winders, resist being coiled, the tape, when being payed into the reel tends to coil about the outer periphery of the chamber defined by the reel. Accordingly, when substantial quantities of the tape have been payed out, difficulty is encountered in rewinding it into the reel.

It is an object of the present invention to provide a fish tape winder wherein all of the tape previously payed out of the reel during use thereof, is readily returned to the reel without tangling, or snarling of the tape within the reel, and without difficulties otherwise experienced due to the resistance of the tape to being tightly coiled.

More particularly, it is an object of the present invention to provide a hand manipulatable friction brake for selective engagement with the fish tape during the paying in thereof to overcome resistance of the tape toward coiling.

Still another object of the invention is to provide a simplified structure, which is readily assembled, and which may be added to existing structures with a minimum of modification to provide the advantages herein stated.

The foregoing, as well as other objects and advantages of the invention will appear upon reading the following detailed disclosure, taken in conjunction with the appended drawings, wherein.

Figure 1:
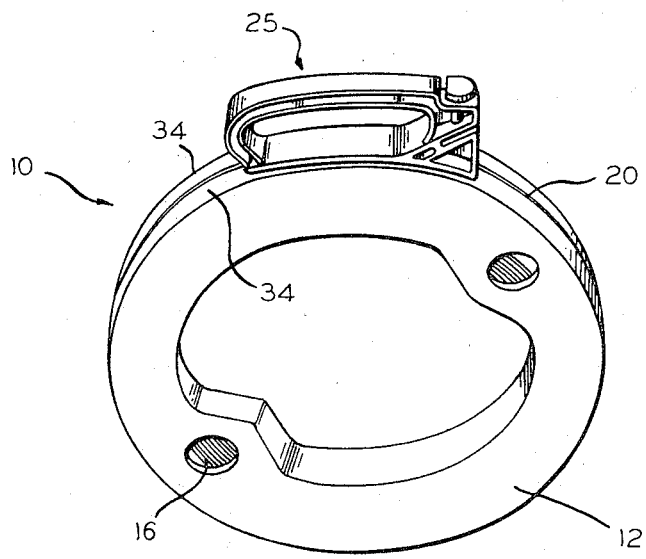
FIG. 1 is a perspective of a fish tape winder of known construction, illustrating the improvement of the present invention.

While the invention is susceptible of various modifications and alternative constructions, a particular illustrative embodiment is shown in the drawing and will be described hereinafter in detail. It will be understood that the described embodiment is for the purposes of exemplifying the invention, and does not represent the limits thereof. It is the intention to cover all modifications, equivalents and alternative constructions falling within the spirit and scope of the invention as expressed in the appended claims.

With reference now to the drawings, and particularly to FIG. 1, a fish tape winder 10, which is exemplary of the structure to which the present invention has application, is shown. The fish tape winder comprises a reel 12 which defines a toroidal chamber 14 (FIG. 2) into which a long continuous strand of fish tape wire 16 is coiled. The reel is provided with a slot 20 through which fish tape may be payed in or payed out of the chamber 14. A handle 25 is provided which, in the illustrated case, rides in the slot 20 and is therefore movable about the reel.

It will be appreciated that the specific manner of mounting the handle relative to the reel may vary without departure from the invention. The handle 25, in the illustrated case, is maintained in the slot by means of feet 27 formed thereon which define, in conjunction with a flange 29, a panel 32 which receives the normally abutting edges of the sidewalls 34 of the reel. With identical channels 32 formed on either side of a center web 36, the handle is secured for sliding movement between the sidewalls 34, which, though normally biased toward one another, are caused to spread apart by the width of the tape. In this manner the sidewalls maintain a gripping pressure on the tape. The handle is thus held conveniently in place for movement in the slot defined between the abutting edges of the sidewalls 34.

The handle itself is conveniently formed of plastic, although other materials may be used without departure from the invention. It is molded as a unitary member having parallel finger gripping flange portions 40 joined by a central transverse web section 42, to add strength to the handle.

Figure 3:
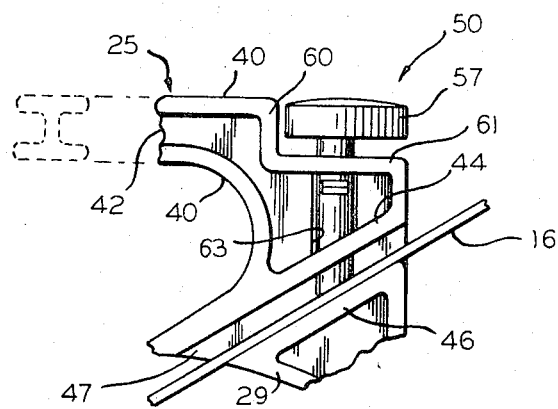
FIG. 3 is a greatly enlarged partially fragmented portion of the handle and tape guideway, illustrating the co-action of the friction brake and associate fish tape.

In order to provide control over the fish tape 16, as it is payed into, and out of the reel, the handle 25 is formed with a pair of intermediate wall sections 44 and 46, respectively, which, as may be seen in FIG. 3, slope upwardly at a convenient angle from the reel. The walls 44 and 46 define a guideway which is aligned with the space between the feet 27, and the fish tape 16 extends through the slot, the guideway, and beyond the winder.

Figure 2:
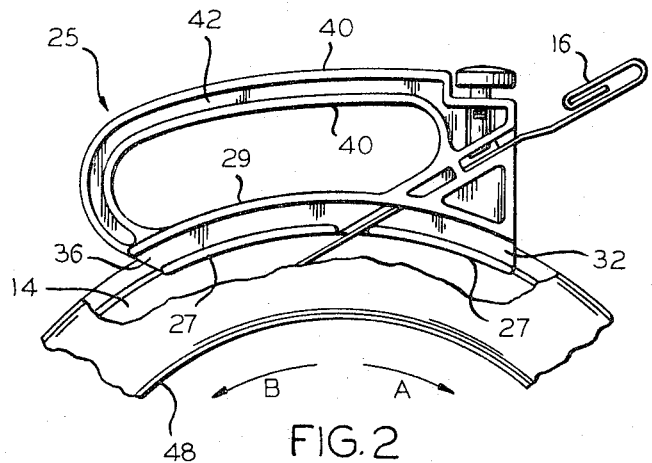
FIG. 2 is an enlarged, partially sectioned and fragmented, side elevation of a portion of the reel and handle, illustrating the friction brake mechanism of the present invention.

In use, and presuming that the tape is wound in the chamber about the inner peripheral wall 48 of the reel in a clockwise manner, the tape 16 would be payed out of the reel by holding the handle 25 relatively stationary, and pulling the tape out with one hand, thus causing the reel to rotate in a clockwise manner, indicated by the arrow A in FIG. 2. The action would force the tape through the guideway from the coil within the reel. Very little problem is experienced in the paying out of tape in this manner. When tape is to be payed back into the reel, however, the high energy of the tape, which causes it to resist being coiled, results in difficulty in getting the tape tightly recoiled within the toroidal chamber. Specifically the tape attempts to assume the largest possible coil diameter permitted by the reel. As a consequence a number of loose coils occur which not only take up valuable space, but may become snarled or tangled.

In order to alleviate this problem, there is provided, in accordance with the invention, a friction brake arrangement which permits the operator to overcome the resistance of the tape to being coiled, and thereby permits the paying in operation to be conducted with a minimum of difficulty.

Figure 4:
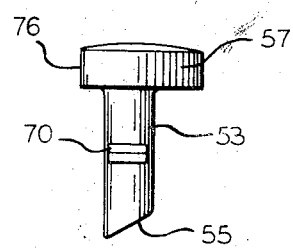
FIGS. 4 and 5 illustrate two views of the friction brake button, showing details of construction thereof.
Figure 5:
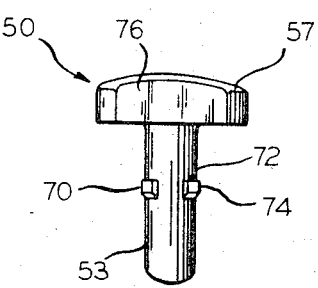

More particularly, and referring to FIGS. 3, 4 and 5, a friction engaging pressure member 50 is provided and mounted for operation in the handle 25 where it is extensible into the guideway 47 for engagement with the tape 16.

The pressure member or button 50 comprises an elongated stem portion 53 which terminates in a beveled end portion 55. It is the portion 55 which is intended to extend into the guideway 47 and engage the tape to act as a friction drag on the tape. The end 55 is tapered or beveled at an angle which approximates the slope of the guideway itself relative to the axis of the button. In this manner, maximum area of engagement is achieved with the tape, thereby minimizing the force which must be applied in order to effect maximum braking force.

It will be appreciated that by placing the guideway at an acute angle, the force on the tape tending to pull the same into the reel has a component which is complementary with the finger pressure on the button. Thus greater braking pressure is possible with less manual effort.

At the other end of the stem 53 a large head 57 is provided. The head is constructed to be conveniently engaged by a finger of the user, preferably the thumb, and provides a substantial surface against which finger pressure may be applied to effect braking of the tape.

In order to afford maximum utility of the friction braking member 50, it is mounted in the handle for reciprocal movement with respect thereto. With particular reference to FIG. 3, the handle 25 is formed with a recess or indentation defined by wall portions 60 and 61, respectively. It will be understood that these wall portions comprise a continuation of the wall 40 and are, therefore, flanged in the same manner. A generally vertical aperture 63 is formed through the wall members 61 and 44 and the portion of the web 42 disposed therebetween. Since the web is relatively thin, that portion of the web is completely severed in order to provide sufficient room for the stem, which is of greater diameter than the thickness of the web.

As seen in FIGS. 2 and 3, the button 50 is inserted in the aperture provided in the handle and the end 55 thus resides in the guideway 47 where it is, by virtue of its own weight, in loose engagement with the tape 16. In order to apply a substantial braking force to the tape, one need only press on the head 57, and the force will be transmitted by the stem to the tape, causing the tape to be pressed between the surface 55 and the surface of the wall member 46. Thus, in paying in the tape, and with the handle 25 held relatively stationary, and the reel 12 being moved counterclockwise in the direction of arrow B (FIG. 2) the application of finger pressure to the head 57 will cause a substantial friction drag on the tape 16, which will be sufficient to overcome the resistance of the tape to be tightly coiled. As a result of the friction drag created by the brake, the tape is pulled into a tight coil about the inner peripheral wall 48 of the reel, with the consequent advantages of no tangling of the tape within the reel, and the ready receipt of all of the tape within the reel without crowding or having to force the tape due to loose coiling thereof.

In order that the button 50 may be maintained in the handle, there is provided, in keeping with this aspect of the invention, a series of bosses 70 which are integrally formed on the stem 53, and which hold this button between the wall portions 61 and 44, respectively.

With particular reference to FIG. 5, the boss 70 is formed with a flat 72 defining a shoulder facing the underside of the head 57, and the outer wall 74 thereof is tapered towards the periphery of the stem 53. Thus, the button 50 is readily mounted in the aperture provided therefor, by simply forcing the same through the hole provided in the wall portion 61, which is of slightly less diameter than the width of the stem and boss. The shoulder 72 will thereafter resist removal of the button in the same manner. The tapered wall 74, of course, facilitates initial insertion, acting as a ramp when downward pressure is applied to the button to urge the same into the aperture.

While wear tests have indicated a low incidence of wear, replacement of the button 60 for any number of reasons may, from time to time, be necessary. The bosses 70, while capable of preventing removal of the button under normal use conditions, are sized so that the button may be forced out of its aperture 63 when it is desirable to remove the same. A replacement button is readily inserted by simply forcing the same down into the aperture with the bosses 70 passing the wall 61. It will be noted in FIG. 3 that the bosses 70 are conveniently disposed on opposite sides of the stem and, therefore, cause no interference with the web portion 42 which is completely removed in the area of the aperture.

It will be appreciated that, should increased life of the button be desirable, a metal cap or plug could readily be placed on the inclined surface thereof, or a metal liner could be provided in the guideway 47, these modifications being fully contemplated by the invention.

In order to insure proper alignment of the surface 55 with the slope of the guideway, a position flat 76 is formed on the head. While the particular arrangement of the flat relative to the angle of the surface 55 is a matter of choice, in the exemplary case shown, the flat is disposed to indicate the lowermost extension of the stem. In this manner, by providing the head portion with a diameter which exceeds the room provided in the indented or recessed portion of the handle defined by the wall portions 60 and 61, respectively, the button cannot be improperly installed since the flat 76 will necessarily face the wall portion 60 in order for the button to be installed at all. Thus, the button is capable of installation only in its correct position. Furthermore, as will be seen in FIGS. 2 and 3, the top of the head is approximately flush with the top of the handle. Thus, no protrusion is experienced, which might interfere with the use of the fish tape winder. Moreover, the position of the button is such that, in normal use, the user's thumb will easily be in position to engage the button to apply the necessary friction drag during the paying in procedure.

It has been found that the button may be initially installed during the forming process. The material used experiences a certain amount of expansion during the molding thereof due to the heat applied. Accordingly, by cooling the button, the same may be easily installed in the handle, which remains hot and therefore somewhat expanded, without the necessity of applying force to the button to get the bosses past the aperture in the flange or wall section 61. In this manner, initial installation is greatly simplified.

Having now described what is believed to be the preferred embodiment of the invention in detail, there is claimed:

1. In a fish tape winder having a reel formed with a circumferential slot thereabout, housing a quantity of tape, a handle adapted to be held in one hand of the user and being engaged in said slot for movement about the periphery of the reel to pay in and pay out the tape, said handle having a guideway formed therein with opposed wall surface portions, said guideway opening through said slot so that tape coiled in said reel may pass through said guideway, a brake member comprising a reciprocally mounted stem portion with an end of said stem portion being disposed in said guideway and the other end thereof projecting upwards from said guideway wherein selectively exerted finger pressure applied to said other end puts said tape into direct, frictional engagement with one of said wall surface portions of said guideway.

2. The apparatus as set forth in claim 1, wherein said other end of said stem comprises a button having an enlarged upper surface which is flush with said handle.

3. The apparatus as set forth in claim 1 wherein said handle comprises flanged wall portions, having a transverse web therebetween, one of said walls defining a portion of said guideway, and an aperture formed in said flanged wall, said stem being disposed in said aperture and a boss disposed on said stem, said boss having a shoulder thereon for engagement with one of said flanged walls to prevent removal of said brake member.

4. The apparatus as set forth in claim 3 wherein said boss tapers inwardly from said shoulder so as to permit said stem to be urged into said aperture past said flanged wall.

5. The apparatus as set forth in claim 1 wherein the end of said stem protruding into said guideway is beveled so as to be parallel with the walls of said guideway.

6. The apparatus as set forth in claim 2 wherein said button is formed with a locating flat thereon, said flat being in a predetermined position with respect to said beveled end of said stem so as to permit orientation of said beveled end of said stem with said guideway.

References Cited

UNITED STATES PATENTS

| 2,906,471 | 9/1959 | Huff | 242—84.8 |
| 2,913,222 | 10/1959 | Kuzara | 254—134.3 |
| 3,355,123 | 10/1967 | Schinske | 242—84.8 |

FOREIGN PATENTS

| 112,079 | 1964 | Czechoslovakia. |

ROBERT C. RIORDON, Primary Examiner

D. R. MELTON, Assistant Examiner

U.S. Cl. X.R.

242—84.8